United States Patent
Yasuda (10) Patent No.: US 7,560,836 B2
(45) Date of Patent: Jul. 14, 2009

(54) DRIVING DEVICE AND LIGHT AMOUNT ADJUSTING DEVICE

(75) Inventor: Hiromu Yasuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 511 days.

(21) Appl. No.: 11/536,622

(22) Filed: Sep. 28, 2006

(65) Prior Publication Data

US 2007/0090698 A1    Apr. 26, 2007

(30) Foreign Application Priority Data

Oct. 21, 2005    (JP)    ............... 2005-307504

(51) Int. Cl.
    *H02K 37/12*    (2006.01)
(52) U.S. Cl. .................... 310/49 R; 310/268
(58) Field of Classification Search ............... 310/49 R, 310/266, 268, 36
    See application file for complete search history.

(56) References Cited

U.S. PATENT DOCUMENTS

| 4,348,092 | A | 9/1982 | Hirohata et al. |
| 4,349,264 | A | 9/1982 | Tezuka et al. |
| 6,781,772 | B2 | 8/2004 | Miyawaki |
| 6,858,959 | B2 * | 2/2005 | Aoshima ............... 310/156.32 |
| 6,860,655 | B2 | 3/2005 | Miyawaki |
| 7,242,123 | B2 * | 7/2007 | Miyawaki ............... 310/156.32 |
| 2003/0062788 | A1 | 4/2003 | Aoshima |

FOREIGN PATENT DOCUMENTS

| CN | 1411121 A | | 9/2006 |
| JP | 2004-233915 | * | 2/2003 |
| JP | 2004-45682 A | | 2/2004 |

OTHER PUBLICATIONS

Relevant Portion of European Search Report issued in corresponding European Patent Application No. 06019862.9-2209, with mailing date May 2, 2007.

* cited by examiner

*Primary Examiner*—Nguyen N Hanh
(74) *Attorney, Agent, or Firm*—Rossi, Kimms & McDowell, LLP (57) ABSTRACT

A light amount adjusting device mounted with a driving device which can have a reduced size in the direction of thickness. In this controller, a magnet is formed into a hollow circular disk shape and has at least one disk surface magnetized to have alternately different poles in the circumferential direction thereof. A rotor yoke is supported by a bobbin for rotation relative to the magnet, and has magnetic pole parts extending radially of the magnet and facing the magnetized disk surface of the magnet. A stator yoke is disposed on the side remote from the rotor yoke with respect to the magnet and fixed with the magnet. A coil is fixed to the stator yoke and magnetizes the magnetic pole parts of the rotor yoke. Shutter blades are disposed radially inside the magnet.

9 Claims, 11 Drawing Sheets

DRIVING DEVICE AND LIGHT AMOUNT ADJUSTING DEVICE

BACKGROUND OF THE INVENTION

1. Field of the Invention

The present invention relates to a driving device and a light amount adjusting device using the driving device, and more particularly, to a driving device having a reduced size in the direction of rotor rotation axis and a light amount adjusting device utilized in a shutter mechanism, an aperture control mechanism, and the like, in which the driving device is used as a drive source thereof.

2. Description of the Related Art

Conventionally, as a light amount adjusting device for adjusting the amount of exposure in image pickup devices such as a camera and a video camera, there has been proposed a flat actuator which is small in size in the thickness direction thereof (see Japanese Laid-open Patent Publication (Kokai) No. 2004-045682, for example).

Figure 10:
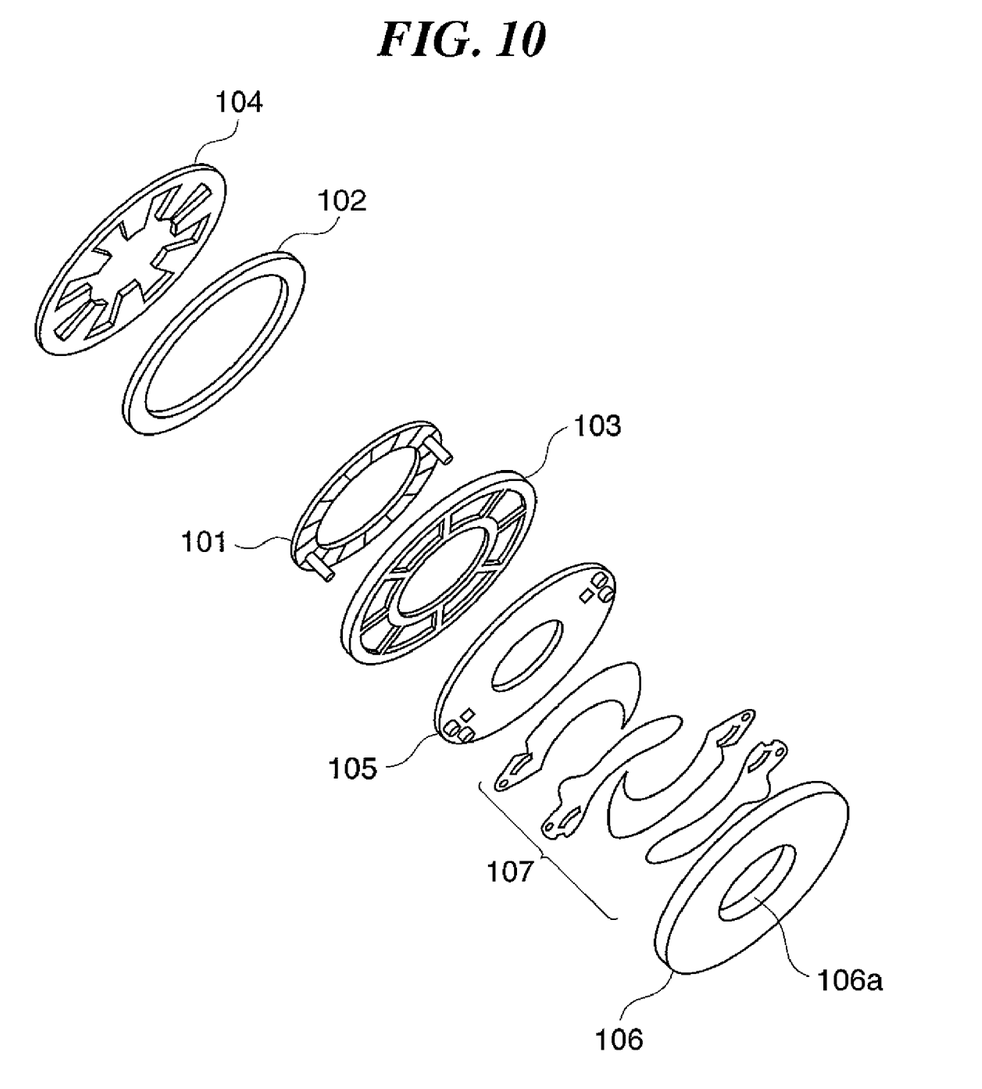
FIG. 10 is an exploded perspective view showing the component parts of the prior art light amount adjusting device.
Figure 11:
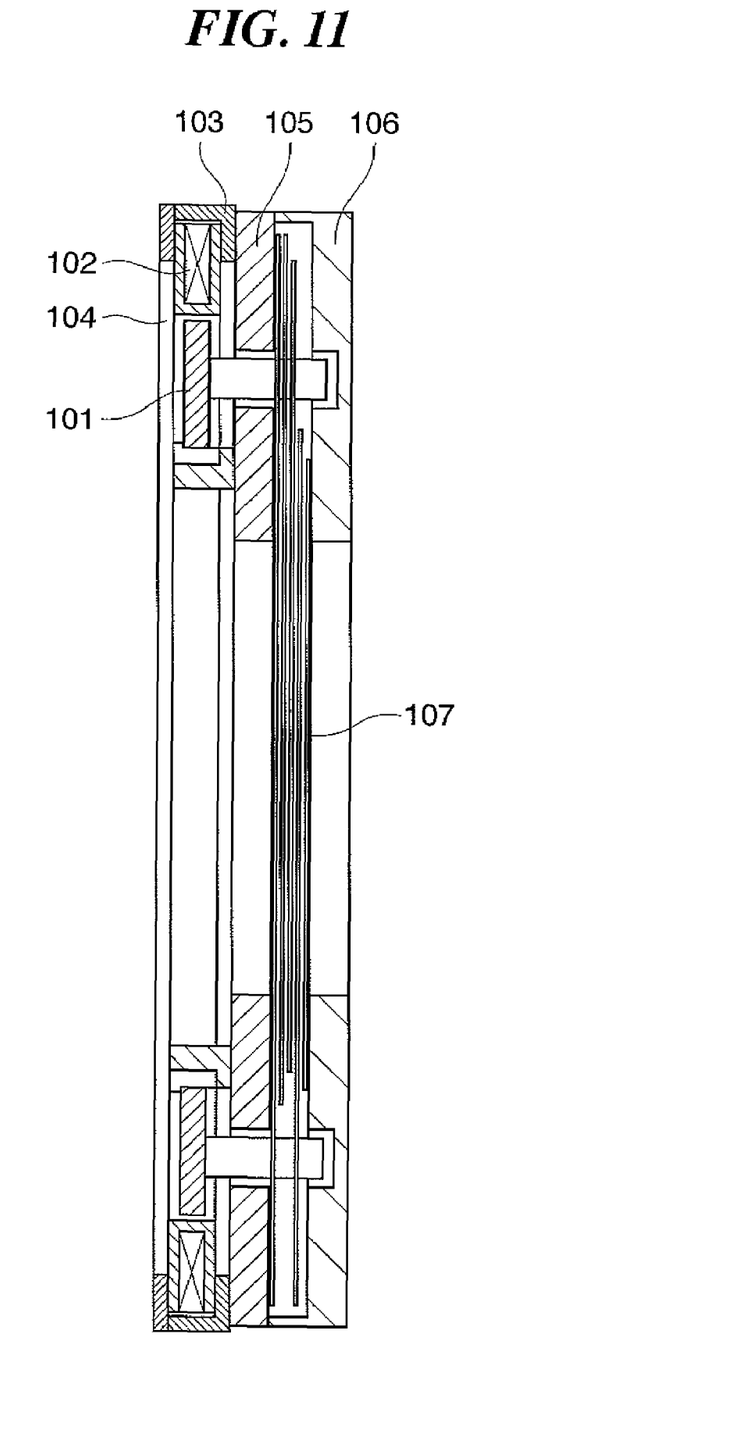
FIG. 11 is a sectional view showing the structure of the light amount adjusting device in an assembled state.

FIG. 10 is an exploded perspective view showing the component parts of the prior art light amount adjusting device disclosed in Japanese Laid-open Patent Publication (Kokai) No. 2004-045682. FIG. 11 is a sectional view showing the structure of the light amount adjusting device in an assembled state.

As shown in FIGS. 10 and 11, the light amount adjusting device is comprised of a driving device and a light amount control mechanism, wherein the driving device includes a rotor magnet 101, a coil 102, a first stator 103, and a second stator 104, whereas the light amount control mechanism includes a base plate 105, a front base plate 106, and a plurality of shutter blades 107.

The rotor magnet 101 is formed into a hollow circular disk shape and held by the base plate 105 for rotation about the center of the circular disk. The rotor magnet 101 has a face extending perpendicular to the center axis thereof and circumferentially divided into areas that are alternately magnetized into different poles. The coil 102 is formed into an annular circular shape, is disposed coaxially with the rotor magnet 101, and is arranged to have an inner peripheral face thereof facing an outer peripheral face of the rotor magnet 101. The first and second stators 103, 104 each have tooth shaped magnetic pole parts extending radially inward. These magnetic pole parts are opposed to the magnetized surface of the rotor magnet 101.

When the coil is supplied with electric power, each of the magnetic pole parts of the first and second stators 103 and 104 is magnetized into an N or S pole, whereby the rotor magnet 101 is rotated reciprocally within a limited range. With the rotation of the rotor magnet 101, the shutter blades 107 are opened or closed, whereby the open area amount of an opening part 106a provided in the front base pale 106 can be adjusted. At this time, the magnetic flux generated by power supply to the coil 102 flows from the magnetic pole parts of the first stator 103 to those of the second stator 104 or flows in the opposite direction, thereby effectively acting on the rotor magnet 101 disposed between these stators 103 and 104. As a result, a small-sized efficient actuator is realized.

In the aforesaid light amount adjusting device, the size of the driving device in the thickness (axial) direction is equal to the sum of the thicknesses of the first stator, the second stator, and the rotor magnet, and a value twice as large as the clearance between the rotor magnet and each of the first and second stators. Thus, the driving device that is thin in the thickness direction can be realized to some extent.

However, with the light amount adjusting device disclosed in Japanese Laid-open Patent Publication (Kokai) No. 2004-045682, the component parts (the magnetic pole parts of the first and second stators and the rotor magnet) of the driving device and the component parts (the shutter blades) of the light amount control mechanism are juxtaposed to one another in the direction of the rotation axis. Thus, the total thickness of the light amount adjusting device is larger than the sum of the thicknesses of these component parts, making it difficult to make the light amount adjusting device thinner.

SUMMARY OF THE INVENTION

An object of the present invention is to provide a driving device which can have a reduced size in the thickness direction thereof and a light amount adjusting device using the same.

To attain the aforesaid object, according to a first aspect of the present invention, there is provided a driving device comprising a magnet formed into a hollow circular disk shape, at least one disk surface of the magnet being magnetized to have alternately different poles in a circumferential direction thereof, a rotor yoke disposed for rotation relative to the magnet, the rotor yoke having magnetic pole parts thereof extending radially of the magnet and facing the magnetized disk surface of the magnet, a stator yoke disposed on a side remote from the rotor yoke with respect to the magnet, with the magnet interposed between the stator yoke and the rotor yoke and with the stator yoke fixed with the magnet, and a coil fixed to the stator yoke for magnetizing the magnetic pole parts of the rotor yoke.

According to the driving device of this invention in which the magnet is fixed to the stator yoke, it is enough to provide a gap only between the magnet and the rotor yoke, making it possible to reduce the size of the driving device in the thickness (axial) direction thereof as compared to the prior art driving device.

Preferably, the coil and the magnet are disposed coaxially with each other, and the coil is disposed radially outside the magnet.

Alternatively, the coil and the magnet are disposed coaxially with each other, and the coil is disposed radially inside the magnet.

Preferably, the driving device comprises a bearing member made of a nonmagnetic material, and the bearing member is interposed between the rotor yoke and the stator yoke so that these yokes are not in direct contact with each other and the rotor yoke is rotatably supported by the bearing member.

Preferably, the driving device comprises a bobbin around which the coil is wound, and the bobbin also serves as the bearing member.

To attain the aforesaid object, according to a second aspect of the present invention, there is provided a light amount adjusting device comprising the driving device according to the first aspect of this invention, a base plate formed with an opening, and a light amount control member that is operable with rotation of the rotor yoke of the driving device to adjust an open area amount of the opening of the base plate.

According to the light amount adjusting device of this invention which comprises the driving device having a reduced size in its thickness direction as mentioned above and in which the light amount control member is disposed preferably radially inside the magnet, it is possible to reduce the size of the light amount adjusting device in the thickness (axial) direction as compared to the prior art light amount adjusting device.

Preferably, the light amount control member is disposed radially inside the magnet of the driving device.

Preferably, the light amount control member is fixed integrally with the rotor yoke and is rotatable coaxially with the rotor yoke.

Preferably, the stator yoke also serves as the base plate.

Further features of the present invention will become apparent from the following description of exemplary embodiments with reference to the attached drawings.

DESCRIPTION OF THE EMBODIMENTS

The present invention will now be described in detail with reference to the drawings showing embodiments thereof.

Figure 1:
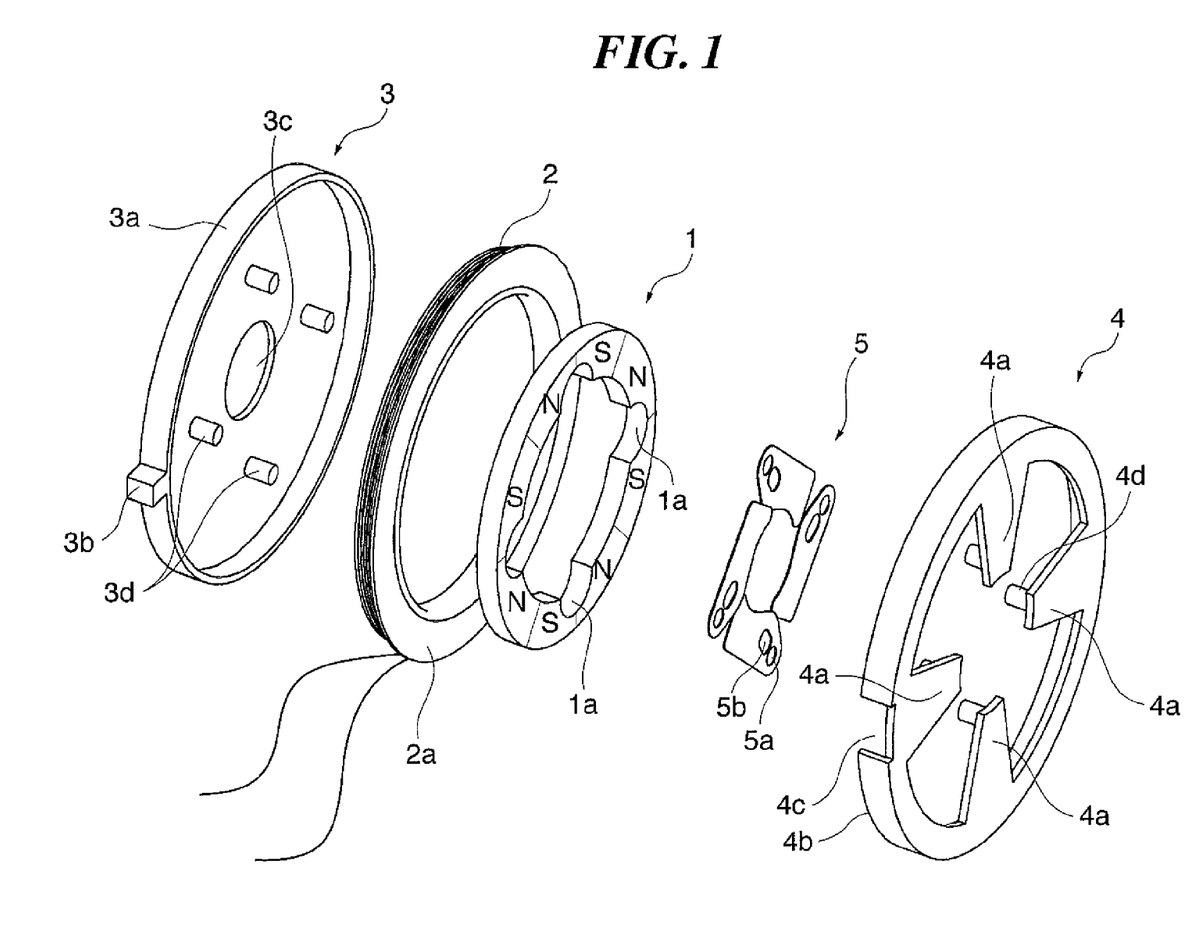
FIG. 1 is an exploded perspective view showing the component parts of a light amount adjusting device according to a first embodiment of the present invention.
Figure 2:
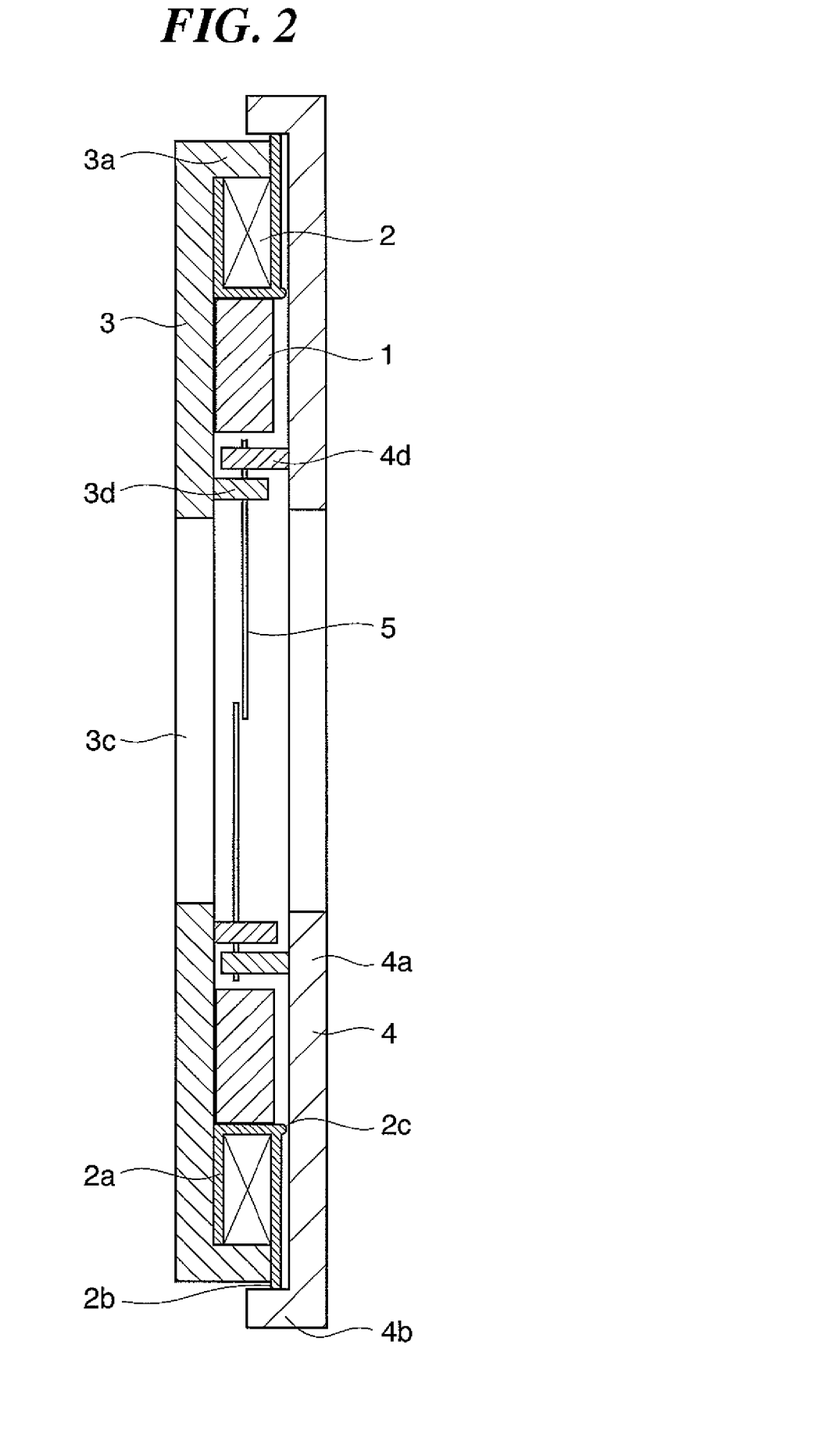
FIG. 2 is a section view showing the structure of the light amount adjusting device in an assembled state.
Figure 3A:
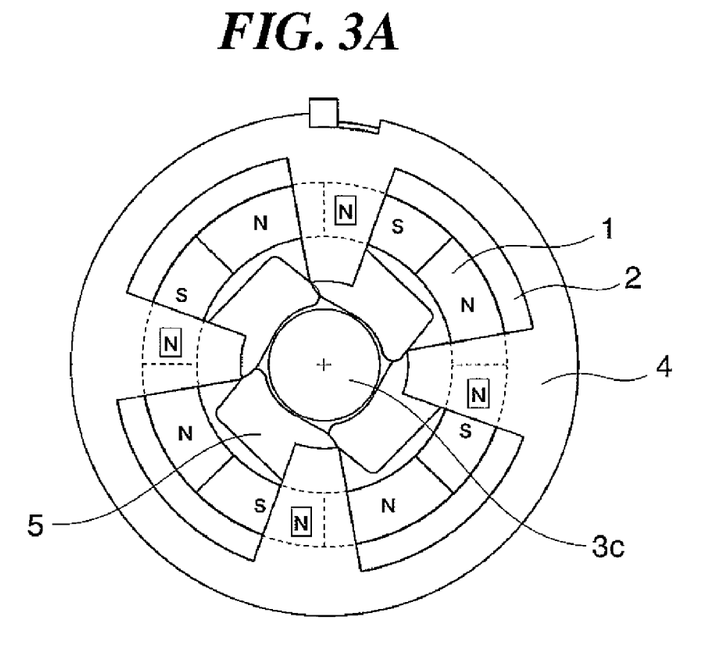
FIG. 3A is a front view showing the light amount adjusting device in a state where the shutter blades are open.
Figure 3B:
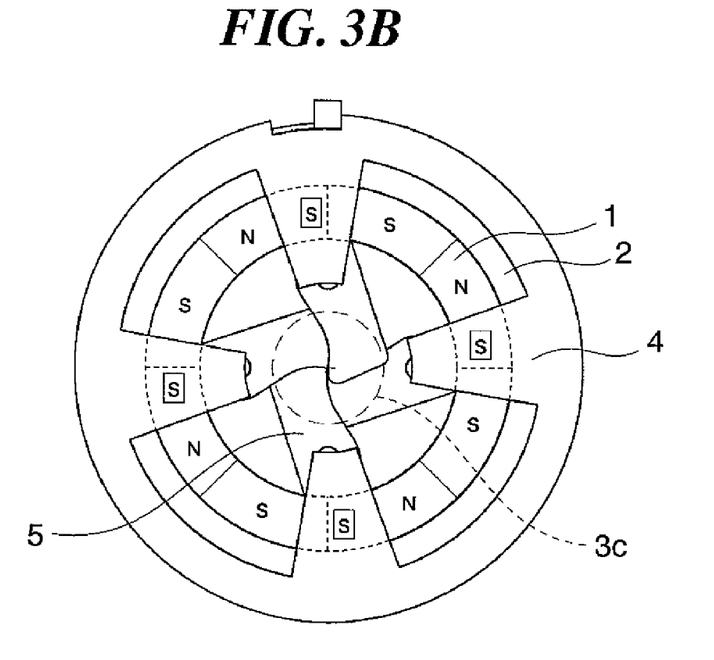
FIG. 3B is a front view showing the light amount adjusting device with the shutter blades closed.

FIG. 1 is an exploded perspective view showing the component parts of a light amount adjusting device according to a first embodiment of the present invention. FIG. 2 is a section view showing the structure of the light amount adjusting device in an assembled state. FIG. 3A is a front view showing the light amount adjusting device in a state where the shutter blades are open, and FIG. 3B is a front view showing the light amount adjusting device with the shutter blades closed.

Referring to FIGS. 1 through 3B, the light amount adjusting device which is used as a shutter mechanism for a camera barrel is comprised of a magnet 1, a coil 2, a stator yoke 3, a rotor yoke 4, and shutter blades 5. In the light amount adjusting device, the magnet 1, the coil 2, the stator yoke 3 and the rotor yoke 4 constitute a driving device, whereas the shutter blades 5 constitute a light amount control mechanism.

The magnet 1 is formed into a hollow circular disk shape (a generally annular circular shape). At least one disk surface of the magnet is divided into n areas in the circumferential direction, and these areas are alternately permanently magnetized into N and S poles. The direction of magnetization is perpendicular to the disk surface. In the present embodiment, the number of magnetic poles is made equal to 8. It should be noted that another disk surface of the magnet 1 may be magnetized to poles opposite in polarity to those on the aforesaid magnetized disk surface, or may not be magnetized at all. The shutter blades 5 are disposed radially inside the magnet 1.

The magnet 1 may be provided with a plurality of recesses 1a as in the present embodiment that are notched along the rotating axis direction. Alternatively, the magnet 1 may be formed into a complete hollow circular disk shape provided with no recesses. The magnetic force of the magnet 1 varies in proportion to the size of the section area perpendicular to the direction of magnetization. Thus, in the case of the magnet formed with the recesses, the total area of the recesses must be limited to an extent that the magnetic force of the magnet 1 does not extremely decrease. The provision of the recesses 1a makes it possible to avoid the interference between the magnet 1 and the shutter blades 5, making it possible to decrease the diameter size of the light amount adjusting device.

The coil 2 is comprised of a wire that is wound a large number of times coaxially on an annular bobbin 2a. The thickness of the coil 2 is set to a value that is nearly equal to the thickness of the magnet 1. The magnet 1 and the coil 2 are disposed coaxially with each other along a common plane extending perpendicular to the rotation axis (not shown), and the coil 2 is disposed radially outside the magnet 1.

The bobbin 2a is disposed such that the inner peripheral face thereof is in contact with the outer peripheral face of the magnet 1. The bobbin 2a, which is formed by a nonconductive nonmagnetic material, has an outer periphery thereof provided with a bearing part 2b extending outward in the radial direction and an inner periphery thereof provided with an urged contact part (projection part) projecting in the direction of the rotation axis. The bobbin 2a rotatably supports the rotor yokes 4 while preventing direct contact between the stator yoke 3 and the rotor yoke 4.

The stator yoke 3 is made of a soft magnetic material and formed into a generally circular disk shape. The stator yoke 3 is provided at its outer edge with a cylindrical magnetic flux transmission part 3a. The magnet 1 and the coil 2 are fixed coaxially with each other on one disk surface of the stator yoke 3. The stator yoke 3 is disposed on the side opposite from the rotor yoke 4, with the magnet 1 interposed therebetween. The stator yoke 3 has not only the function of fixing the magnet 1 but also the function of serving as a shutter base plate that supports the shutter blades 5. The magnetic flux transmission part 3a has an inner diameter thereof approximately equal to the outer diameter of the coil 2 and a height (axial length) thereof slightly larger than the height (axial length) of the coil 2.

Furthermore, a rotation limiting pin 3b extending radially outward is provided at the outer periphery of the magnetic flux transmission part 3a of the stator yoke 3. An opening 3c is formed at the central part of the disk face of the stator yoke 3. Around the opening 3c of the stator yoke 3 there are provided pins 3d that are fitted into circular holes (mentioned later) formed in the shutter blades 5. The number of the pins 3 (equal to four in the present embodiment) corresponds to the number of the shutter blades 5.

In this embodiment, the stator yoke 3 is formed into a circular disk shape having no magnetic pole teeth. However, the stator yoke may be formed into a shape having magnetic pole teeth extending outward in the radial direction. In that case, the number of the magnetic pole teeth is made equal to half the number of the magnetic poles of the magnet 1. Preferably, the rotor yoke 4 is disposed such that the center of each of the magnetic pole teeth coincides with the center of a corresponding one of the magnetic poles of the magnet 1.

By using the stator yoke 3 that does not include magnetic pole teeth and is formed into a circular disk shape, it is possible to reduce the cogging torque (variation in torque) in the driving device that is comprised of the magnet 1, the coil 2, the stator yoke 3, and the rotor yoke 4. Furthermore, the rotation of the driving device can be smoothened. In the case of the stator yoke formed into a shape provided with magnetic pole teeth, on the other hand, it is possible to increase the torque of the driving device generated when the driving device is supplied with electric power.

The rotor yoke 4 is made of a soft magnetic material and provided with a plurality of magnetic pole parts 4a that are energized by the coil 2. The rotor yoke 4 is supported by the bobbin 2a for rotation relative to the magnet 1. The magnetic pole parts 4a are opposed to the magnetized surface of the magnet 1 with a predetermined gap therebetween, and are formed as magnetic pole teeth extending outward in the radial direction of the magnet 1. The number of the magnetic pole parts 4a is equal to half the number n of the magnetic poles of the magnet 1 (four in this embodiment).

The rotor yoke 4 is provided at its outer edge with a bearing part 4b that is in contact with the bearing part 2b of the bobbin 2a. The bearing part 4b is formed with a rotation limiting groove 4c into which the rotation limiting pin 3b of the stator yoke 3 is inserted. Shutter driving pins 4d that are fitted into elongated holes (mentioned later) of the shutter blades 5 are respectively provided at tip ends of the magnetic pole parts 4a. The number of the shutter driving pins 4d (four in the present embodiment) is equal to the number of the shutter blades 5.

The shutter blades 5 serve as the light amount control mechanism that cooperates with the aforesaid driving device to constitute the light amount adjusting device. In this embodiment, the number of the shutter blades 5 is equal to four. However, the shutter blades may be any in number. The greater the number of the shutter blades 5, the light amount adjusting device can be more reduced in diameter. On the other hand, the smaller the number of the shutter blades 5, the assembly cost can be more reduced.

Each of the shutter blades 5 is provided with a circular hole 5a into which the pin 3d of the stator yoke 3 is fitted and an elongated hole 5b into which the shutter driving pin 4d of the rotor yoke 4 is fitted. The shutter blades 5 are rotatable around respective ones of the circular holes 5a. At certain rotating positions, the shutter blades 5 can be retreated to positions where they are entirely not superimposed on the opening 3c of the stator yoke 3 (in the open state shown in FIG. 3A). At different rotating positions, the shutter blades can completely cover the opening 3c of the stator yoke 3 (in the closing state shown in FIG. 3B).

In this embodiment, the stator of the driving device is constituted by coaxially fixing the magnet 1 and the coil 2 on one disk surface of the stator yoke 3 as explained above. Furthermore, the rotor of the driving device is constituted by the rotor yoke 4 that is rotatably supported by the stator yoke 3.

In this embodiment, the rotor is positioned in the radial direction by the bearing part 4b of the rotor yoke 4 being in contact with the bearing part 2b of the bobbin 2. The rotor is positioned in the axial direction by the rotor yoke 4 being supported by the contact part 2c of the bobbin 2a. The stator yoke 3 and the rotor yoke 4 always attract each other due to the magnetic field generated by the magnet 1. For this reason, it is enough to axially position the rotor from one side by the contact part 2c of the bobbin 2a. In the case where a large axial force acts on the rotor yoke 4, the positioning is made also from right in FIG. 2, i.e., the axially upper side (the side opposite from the contact part 2c).

It is preferable in this embodiment that a bearing be provided to avoid a contact between the stator yoke 3 and the rotor yoke 4. The following is the reason why such bearing be provided.

As will be described later, the magnetic flux flows between the stator yoke 3 and the rotor yoke 4 during the operation of the driving device, so that a magnetic attracting force is generated between the stator yoke 3 and the rotor yoke 4. The magnetic force varies in inverse proportion to the square of the distance L, $1/L^2$, and therefore, the magnetic force abruptly increases when the stator yoke 3 and the rotor yoke 4 are in contact with each other. The magnetic attracting force acts as a frictional force, and hence decreases the output of the driving device.

In the present embodiment, the bearing part 2b and the contact part 2c of the bobbin 2a made of a nonmagnetic material provide a bearing whereby the stator yoke 3 and the rotor yoke 4 are prevented from being in contact with each other. This decreases a frictional contact force, making it possible to enhance the output of the driving device.

It is not inevitably necessary to use the above-mentioned method for providing a bearing that prevents the stator yoke and the rotor yoke from being in contact with each other. Instead, a method for increasing the magnetic resistance may be used while permitting the stator yoke and the rotor yoke to be in contact with each other. In this case, surfaces of the stator yoke 3 and the rotor yoke 4 are preferably plated so as to increase the sliding ability of the contact faces of the stator yoke and the rotor yoke.

As other methods for providing a bearing support, there may be a method of using ball bearings, a method in which several balls (that are used for a ball bearing) are disposed on the outer edge of the stator yoke to thereby increase the sliding ability, and the like method. Any method may be adopted so long as the rotor yoke can be rotatably supported relative to the stator yoke.

The angular region (movable range) in which the rotor yoke 4 is rotatable is limited by a state of engagement between the rotation limiting pin 3b of the stator yoke 3 and the rotation limiting groove 4c of the rotor yoke 4. Specifically, the rotor yoke 4 can be rotated from an angle (angular position) at which the rotation limiting pin 3b is in contact with one end of the rotation limiting groove 4c to an angle (angular position) at which the rotation limiting pin 3b is in contact with another end of the rotation limiting groove 4c.

With the arrangement where the shutter driving pins 4d are fitted into the elongated holes 5b of the shutter blades 5, the shutter blades 5 can be rotated around the circular holes 5a with the rotation of the rotor yoke 4. Further, with the rotation of the shutter blades 5, the opening 3c of the stator yoke 3 can be changed from the open state to the closed state.

Next, with reference to FIGS. 3A through 5, an explanation is given of how the rotor yoke 4 is rotated by changing the direction of electric supply to the coil 2 of the driving device in the light amount adjusting device of this embodiment, which is comprised of the driving device and the light amount mechanism having the aforesaid structure.

The magnetic flux generated by electric power supply to the coil 2 flows along a magnetic path loop extending from the stator yoke 3 to the magnet 1 through the magnetic flux transmission part 3a of the stator yoke 3 and the magnetic pole parts 4a of the rotor yoke 4. As a result, the magnetic pole parts 4a of the rotor yoke 4 are each magnetized into an N or S pole. The magnetic interaction between the magnet 1 and the rotor yoke 4 generates a rotation torque that is applied to the rotor yoke 4.

FIGS. 3A and 3B show states between which the rotor yoke 4 is rotated by the magnetic pole parts 4a of the rotor yoke 4 being excited and magnetized. It should be noted that in FIGS. 3A and 3B the magnetic pole parts 4a of the rotor yoke 4 are each denoted by a symbol N or S enclosed by a square box, whereas the magnetic poles of the magnet 1 are each denoted by a symbol N or S not enclosed. The magnetic poles of the magnet 1 and the magnetic pole parts 4a of the rotor yoke 4 are opposed to each other with a small gap therebetween, and therefore, by increasing the magnetic force acting between them, the efficiency of the driving device can be improved.

Figure 4:
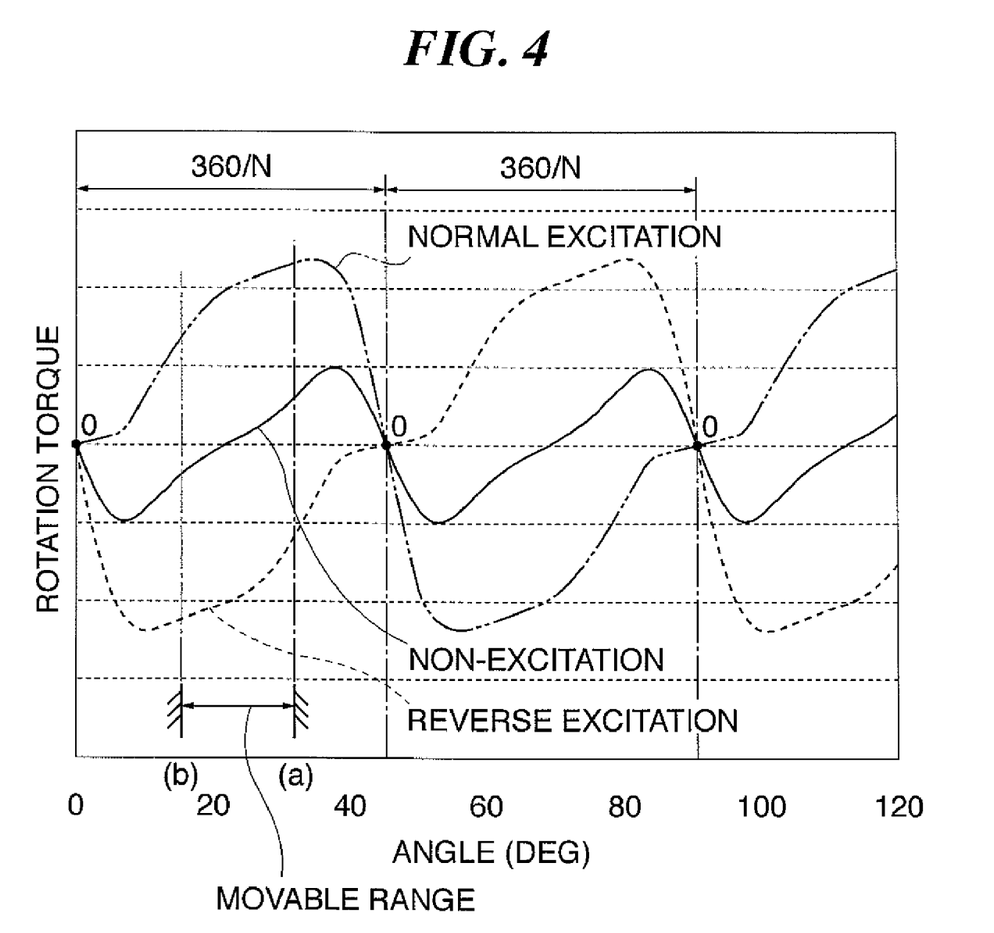
FIG. 4 is a view showing, as a function of the angular position of the rotor yoke, the rotation torque acting on the rotor yoke in a two-position switching system.

FIG. 4 is a view showing, as a function of the angular position of the rotor yoke 4, the rotation torque acting on the rotor yoke 4 in a two-position switching system.

In FIG. 4, the rotation torque acting on the rotor yoke 4 is shown along the ordinate, whereas the angular position of the rotor yoke 4 is shown along the abscissa. A characteristic curve shown by a two-dotted chain line shows the rotation torque generated when electric power is supplied to the coil 2 in the normal direction (normal excitation). A characteristic line shown by a broken line shows the rotation torque generated when electric power is supplied to the coil 2 in the reverse direction (reverse excitation). A characteristic line shown by a solid line shows the rotation torque generated when electric power supply to the coil 2 is disconnected (non-excitation) For convenience of explanation, the rotation torque outside the movable range is also shown in FIG. 4, the movable range being defined by the contact between the rotation limiting pin 3b of the stator yoke 3 and the rotation limiting groove 4c of the rotor yoke 3.

The rotor yoke 4 rotates in the normal direction, e.g., clockwise when the rotation torque takes a positive value, whereas it rotates in the reverse direction, e.g., counterclockwise when the rotation torque takes a negative value. At particular points (points 0 shown in FIG. 4) where the pole center of the magnet 1 and the center of the associated magnetic pole part 4a of the rotor yoke 4 face each other, the rotation torque acting on the rotor yoke 4 is equal to zero irrespective of whether the coil 2 is in the normal excitation, the reverse excitation, or the non-excitation. In particular, when the tooth width of the magnetic pole part 4a of the rotor yoke 4 is made equal to or less than a predetermined value, the aforesaid particular point where the pole center of the magnet 1 and the magnetic pole part 4a of the rotor yoke 4 face each other represents a stable point for the rotor yoke 4, to which the rotor yoke 4 returns even after having been moved therefrom by a minute amount.

In the case where the stable point is included in the movable range, if the rotor yoke 4 is moved to and stopped at the stable point, the rotor yoke 4 can be inoperable in some cases. The magnet 1 has one side surface circumferentially divided into n areas that are magnetized alternately to different poles. Thus, the stable point appears periodically at intervals of 360/N degrees (where N represents the number of magnetic poles of the magnet 1, and the stable point appears at intervals of 360/8=45 degrees in this embodiment). In order to avoid the inclusion of the stable point in the movable range of the rotor yoke 4, the movable range must be set to be equal to or smaller than 360/N degrees in terms of angle.

According to the present embodiment, by setting the movable range of the rotor yoke 4 as shown in FIG. 4, it is possible to always apply the rotation torque to the rotor yoke 4 in the normal direction when the coil 2 is in the normal excitation, and always apply the rotation torque to the rotor yoke in the reverse direction when the coil is in the reverse excitation.

When supplying the coil 2 with electric power in the normal direction, the rotor yoke 4 receives the rotation torque acting clockwise in FIG. 3A, so that the rotor yoke 4 rotates until the rotation limiting groove 4c of the rotor yoke 4 is brought in contact with one end face of the rotation limiting pin 3b of the stator yoke 3. Such state is shown in FIG. 3A, and the corresponding angular position of the rotor yoke 4 is shown by (a) in FIG. 4.

Even if the electric supply to the coil 2 is interrupted when the rotor yoke 4 is at such angular position (a), the normal rotation torque is still applied to the rotor yoke 4 as understood from FIG. 4. As a consequence, the rotation limiting groove 4c of the rotor yoke 4 is caused to be pressed against the rotation limiting pin 3b of the stator yoke 3, whereby the such position can be kept unchanged even if the coil is in the non-excitation state. At that time, the shutter blades 5 are driven by the shutter driving pins 4 of the rotor yoke 4 which are in engagement with the elongated holes 5b so that the shutter blades are retreated from the opening 3c of the stator yoke 3 (resulting in the open state).

Next, when the coil 2 is supplied with electric power in the reverse direction, the rotor yoke 4 receives the torque acting counterclockwise so that the rotor yoke 4 is caused to rotate until the rotation limiting groove 4c of the rotor yoke 4 is brought in contact with another end face of the rotation limiting pin 3b of the stator yoke 3. Such state is shown in FIG. 3B, and the corresponding angular position of the rotor yoke 4 is shown by (b) in FIG. 4.

Even if the electric power supply to the coil 2 is disconnected when the rotor yoke 4 is at the position (b), the rotation limiting groove 4c of the rotor yoke 4 is caused to be pressed against the rotation limiting pin 3b of the stator yoke 3, whereby such position can be kept unchanged even in the non-excitation state, as in the aforesaid case. At this time, the shutter blades 5 are driven by the shutter driving pins 4d of the rotor yoke 4 fitted into the elongated holes 5b, so that the opening 3c of the stator yoke 3 is covered by the shutter blades (resulting in the closed state).

In this embodiment, the two-position switching system has been explained. In the two-position switching system, the rotor yoke 4 is moved to the position (a) in FIG. 4 by supplying the coil 2 with electric power in the normal direction, and is moved to the position (b) in FIG. 4 by supplying the coil 2 with electric power in the reverse direction. During the non-excitation state, the rotor yoke 4 is kept at a corresponding one of these two positions.

In operating the rotor yoke 4, it is not inevitably necessary to use the two-position switching system. Instead, a three-position switching system may be used. In the three-position switching system, the rotor yoke 4 is moved toward one end of the movable range by the normal excitation of the coil 2, is moved toward another end of the movable range by the reverse excitation, and is moved toward the stable point located near the center of the movable range in the non-excitation state.

With the change in the tooth width and/or the shape of the magnetic pole parts 4a of the rotor yoke 4, the magnetic force acting on the rotor yoke 4 changes, and the waveform of rotation torque also changes. In a case where the tooth width of each magnetic pole part 4a of the rotor yoke 4 is made equal to or larger than a predetermined value, the magnet 1 has a stable position where each of boundaries between adjacent magnetic poles of the magnet faces the center of an associated magnetic pole part 4a of the rotor yoke 4. The waveform of rotation torque acting on the rotor yoke 4 in that case is shown in FIG. 5.

Figure 5:
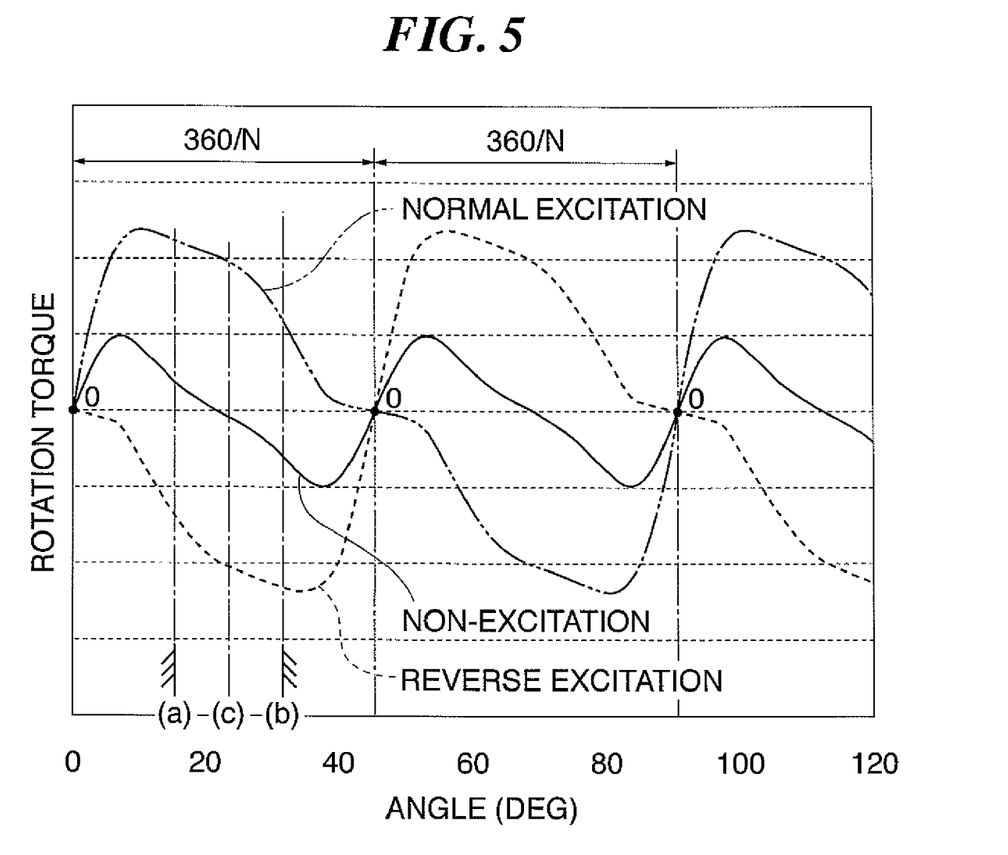
FIG. 5 is a view showing the rotation torque acting on the rotor yoke in a three-position switching system.

FIG. 5 is a view showing the rotation torque acting on the rotor yoke 4 in the three-position switching system.

Referring to FIG. 5, when electric power is supplied to the coil 2 in the normal direction, the rotation torque acts on the rotor yoke 4 in the normal direction, so that the rotor yoke 4 is moved toward one end (shown by (b) in FIG. 5) of the movable range. When electric power is supplied to the coil 2 in the reverse direction, the rotation torque acts on the rotor yoke 4 in the reverse direction, so that the rotor yoke 4 is moved toward another end (shown by (a) in FIG. 5) of the movable range. When the electric power supply to the coil 2 is interrupted, the rotor yoke 4 is moved toward the stable position in the non-power supply state (shown by (c) in FIG. 5), at which each of the boundaries between poles of the magnetized portion of the magnet 1 faces the center of the associated magnetic pole part 4a of the rotor yoke 4. In this manner, the rotor yoke 4 can also be operated under the three-position switching system.

A stepless switching system other than the two- and three-position switching systems can also be used. In the stepless switching system, the rotor yoke 4 is urged by means of one or more springs in the direction of rotation, and the voltage applied to the coil 2 is increased or decreased to thereby steplessly change the rotation angular position of the rotor yoke 4.

In the case of the stepless switching system, the rotor yoke 4 is moved toward the position shown by (b) in FIG. 5 when the maximum voltage is applied to the coil 2. With a gradual reduction in the voltage applied to the coil 2, a gradual change occurs in the position at which the spring force and the electromagnetic force are balanced with each other. As a consequence, the rotor yoke 4 gradually approaches the position shown by (a) in FIG. 5. When the power supply to the coil 2 is interrupted, the rotor yoke 4 is moved to the position shown by (a) in FIG. 5. With the aforesaid operation, the amount of light passing through the opening 3c of the stator yoke 3 can be steplessly adjusted.

As explained in the above, according to the light amount adjusting device of this embodiment having the construction where the shutter blades 5 are disposed radially inside the magnet 1, the size in the thickness (rotation axis) direction can be reduced as compared to the prior art light amount adjusting device, whereby further reduction in thickness can be achieved.

In the prior art light amount adjusting device disclosed in Japanese-Laid-open Patent Publication (Kokai) No. 2004-45682, the size in the thickness (axial) direction is equal to the sum of a value twice as large as the thickness of each of the yokes, the thickness of the magnet, a value twice as large as the gap between the magnet and each of the yokes, the thickness of the shutter base plate, and the thickness of the shutter blades.

On the other hand, according to the light amount adjusting device of this embodiment, the shutter blades 5 are disposed radially inside the magnet 1, and the magnet 1 is fixed to the stator yoke 3. Thus, the magnet 1 and the shutter blades 5 are not juxtaposed to each other in the axial direction, so that the gap is provided only between the magnet 1 and the rotor yoke 4, whereby the size of the light amount adjusting device in the thickness direction can be made equal to the sum of a value twice as large as the thickness of each of the yokes, the thickness of the magnet, and the gap between the magnet and the rotor yoke. As a result, the light amount adjusting device incorporating the driving device can be constructed to be thinner as compared to the prior art.

In this embodiment, the magnet 1 is used as a stator component and the rotor yoke 4 is used as a rotor component, which makes it possible to form notches (recesses 1a) in the magnet 1. By the provision of the recesses 1a, the interference between the magnet 1 and the shutter blades 5 can be avoided which would otherwise be caused when the shutter blades 5 are disposed radially inside the magnet 1. This makes it possible to reduce the diameter of the light amount adjusting device and improve the freedom in designing the shape of the shutter blades 5.

Furthermore, in the present embodiment where the outer periphery of the rotor yoke 4 is formed into a generally L shape in cross section, the area over which the rotor yoke 4 and the stator yoke 3 face each other can be made large, making it possible to realize a driving device that is low in magnetic resistance and satisfactory in efficiency.

Figure 6:
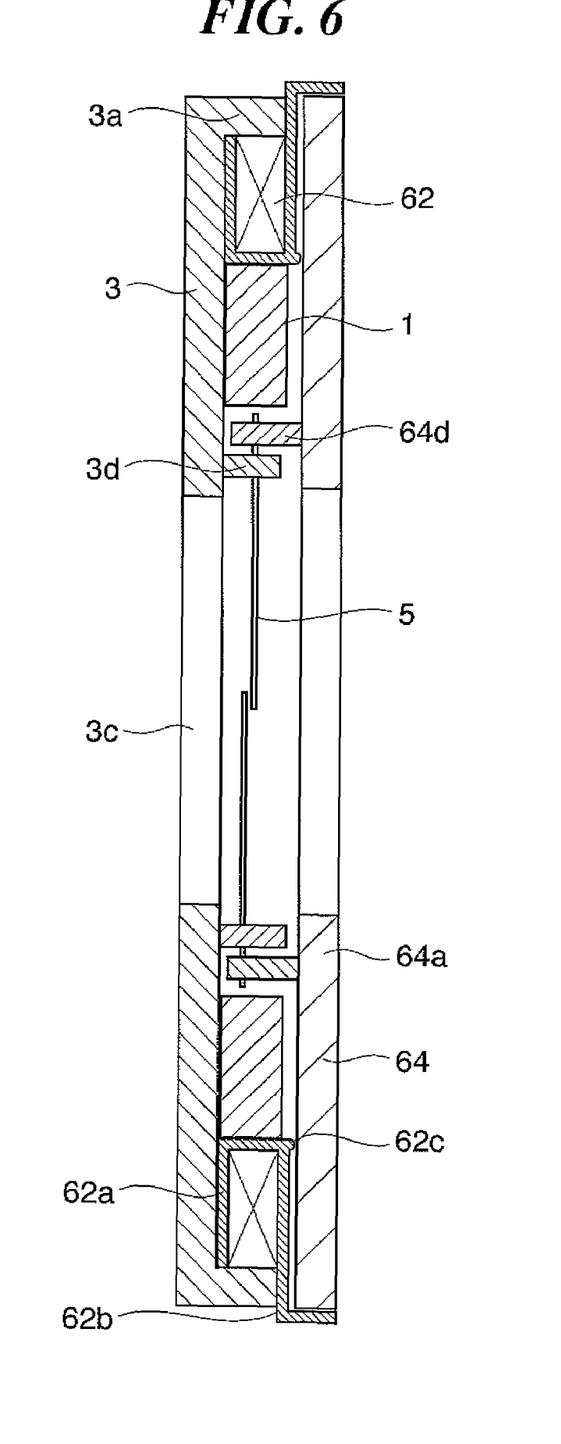
FIG. 6 is a section view showing the construction of a light amount adjusting device according to a second embodiment of the present invention.

FIG. 6 is a section view showing the construction of a light amount adjusting device according to a second embodiment of the present invention.

Referring to FIG. 6, the light amount adjusting device is comprised of a magnet 1, a coil 62, a stator yoke 3, a rotor yoke 64, and shutter blades 5. In this light amount adjusting device, the magnet 1, the coil 62, the stator yoke 3, and the rotor yoke 64 constitute a driving device, and the shutter blades 5 constitute a light amount control mechanism.

This embodiment differs from the first embodiment in that the coil 62 and the rotor yoke 64 have the following construction. The other elements of this embodiment are the same as corresponding ones of the first embodiment (FIG. 2). Like elements are denoted by like numerals, and explanations thereof will be omitted.

The coil 62 is wound around a bobbin 62a that is provided with a bearing part 62b and a contact part (projecting part) 62c. The bobbin 62a of this embodiment differs from the bobbin 2a of the first embodiment in that the bobbin 62a has an outermost peripheral part that extends in the axial direction and serves as the bearing part 62b.

The rotor yoke 64 is made of a soft magnetic material and formed into a generally circular disk shape having the outer diameter nearly equal to the inner diameter of the bearing part 62b of the bobbin 62. As in the rotor yoke 4 of the first embodiment, the rotor yoke 64 is provided with magnetic pole parts 64a and shutter driving pins 64d.

In the present embodiment, the rotor yoke 64 is positioned in the radial direction by the outer peripheral part (outer peripheral face) of the rotor yoke 64 being in contact with the bearing part 62b of the bobbin 62a. The rotor yoke 64 is positioned in the axial direction by the rotor yoke 64 being supported by the contact part 62c of the bobbin 62. As in the first embodiment, a magnetic attractive force acts between the stator yoke 3 and the rotor yoke 64 also in this embodiment, and therefore, it is enough to position the rotor yoke 64 in the axial direction from one side by the contact part 62c of the bobbin 62.

As explained in the above, according to the present embodiment in which the rotor yoke 64 is formed into a generally circular disk shape, it is possible to fabricate the rotor yoke 64 by means of a machining method such as punching which is excellent in efficiency. Thus, a driving device which is further reduced in costs can be realized.

Figure 7:
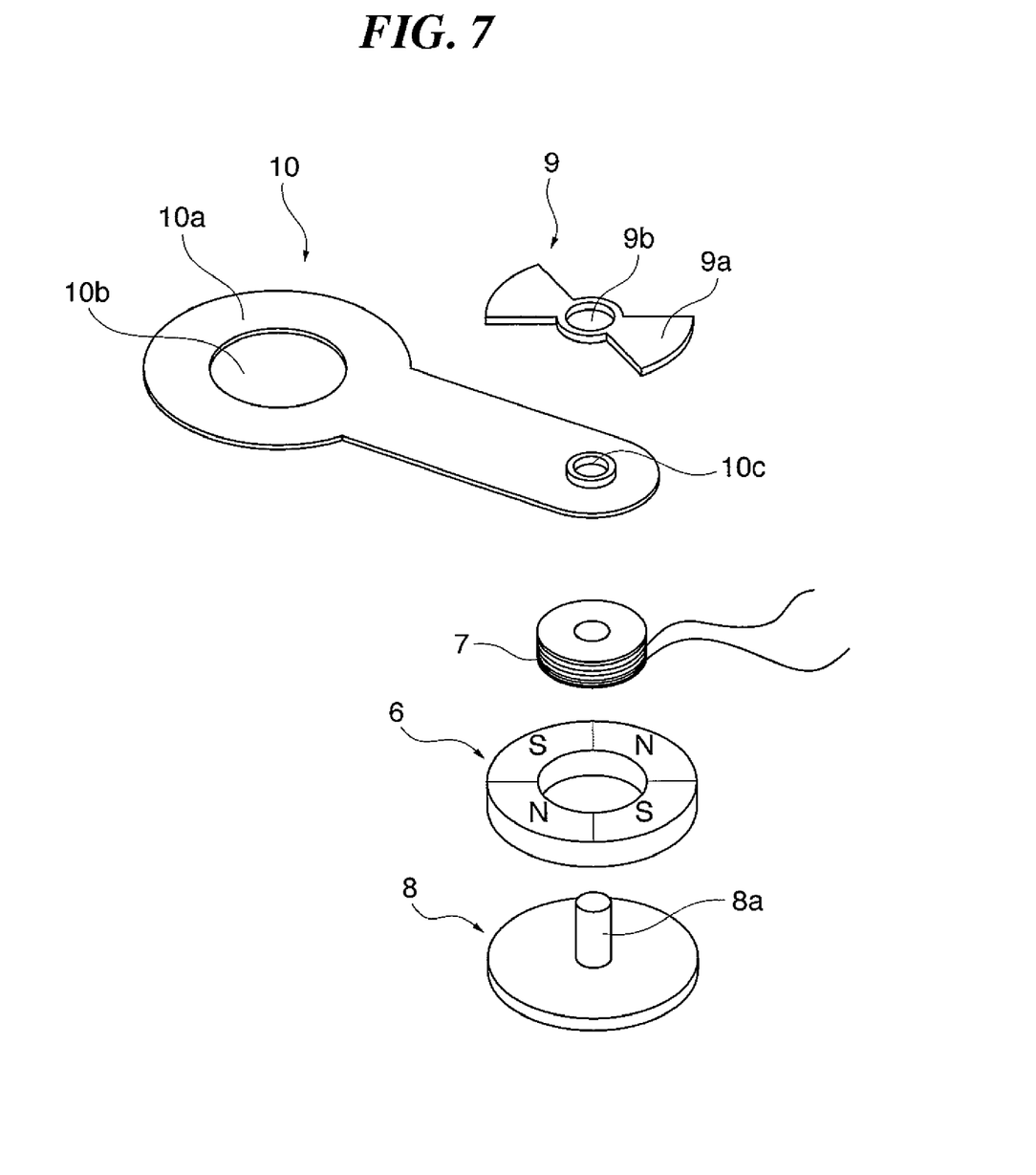
FIG. 7 is an exploded perspective view showing the component parts of a light amount adjusting device according to a third embodiment of the present invention.
Figure 8:
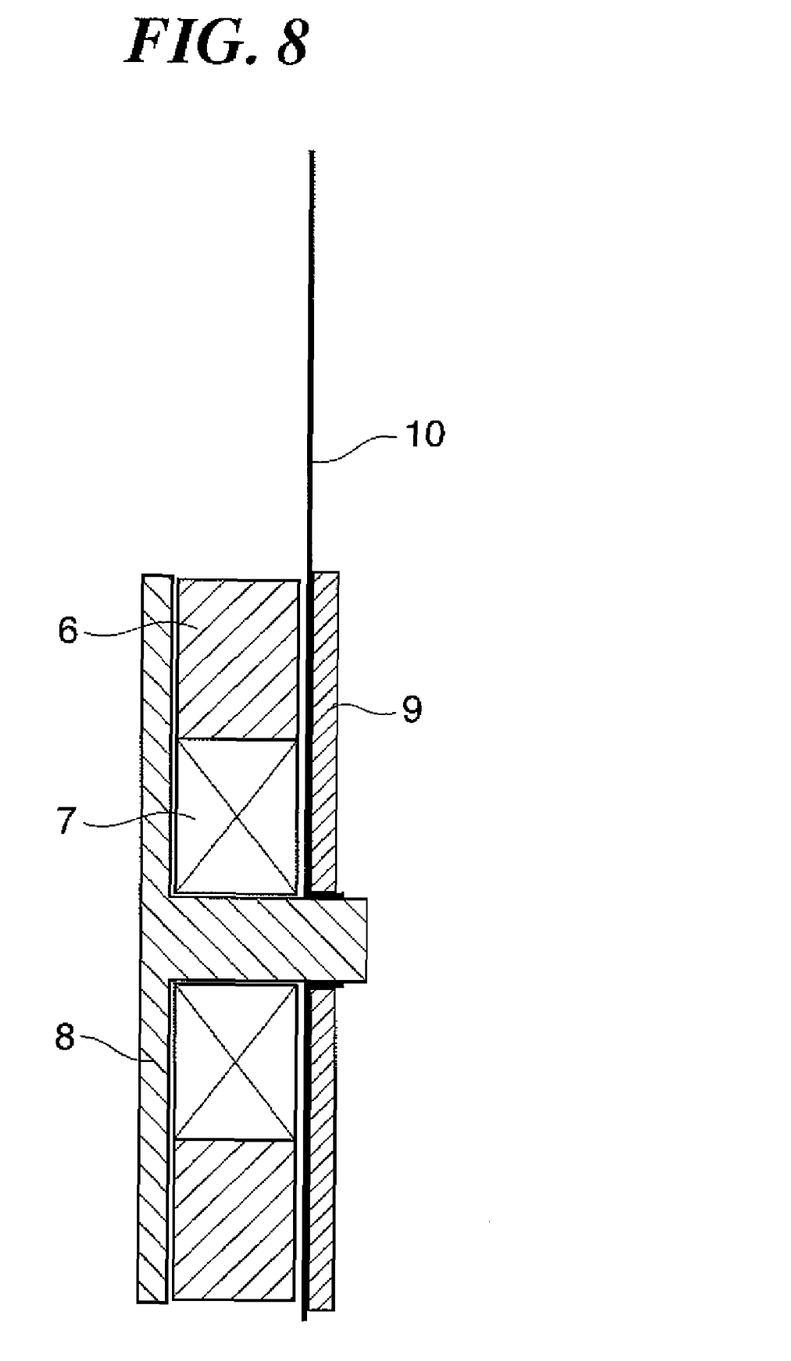
FIG. 8 is a section view showing the structure of the light amount adjusting device in an assembled state.
Figure 9:
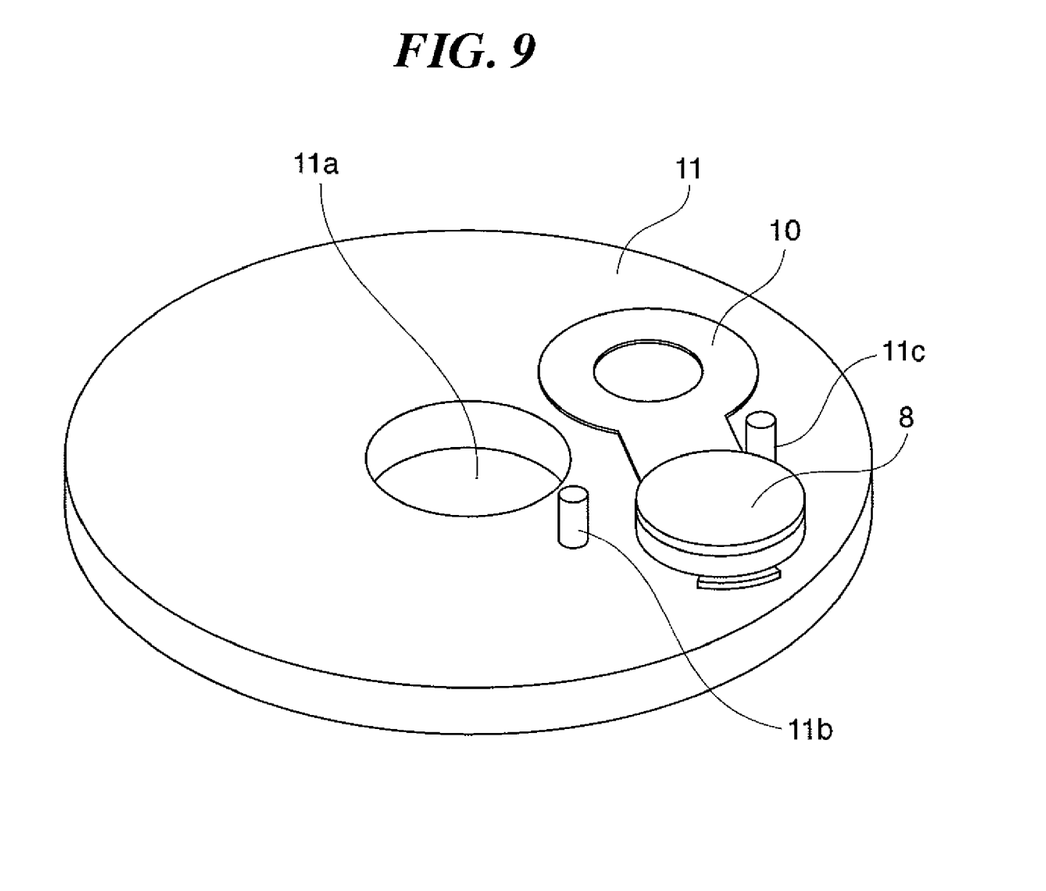
FIG. 9 is a perspective view showing the light amount adjusting device in a fully completed state.

FIG. 7 is an exploded perspective view showing the component parts of a light amount adjusting device according to a third embodiment of the present invention. FIG. 8 is a section view showing the structure of the light amount adjusting device in an assembled state. FIG. 9 is a perspective view showing the light amount adjusting device in a fully completed state.

Referring to FIGS. 7 through 9, the light amount adjusting device is comprised of a magnet 6, a coil 7, a stator yoke 8, a rotor yoke 9, an aperture blade 10, and a base plate 11. In this light amount adjusting device, the magnet 6, the coil 7, the stator yoke 8, and the rotor yoke 9 constitute a driving device, and the aperture blade 10 and the base plate 11 constitute a light amount control mechanism.

The magnet 6 is formed into a hollow circular disk shape (annular circular shape). At least one disk surface of the magnet 6 is divided into n areas in the circumferential direction, which are alternately magnetized into N and S poles. The direction of magnetization is perpendicular to the disk surface of the magnet. In the present embodiment, the number of magnetic poles is set to B. It should be noted that another disk surface of the magnet 6 may be magnetized into poles opposite to those of the one magnetized disk surface of the magnet. Alternatively, the other disk surface may not be magnetized at all.

The coil 7 is comprised of a wire that is coaxially wound a large number of times. The coil 7 is disposed radially inside the magnet 6 so that its outer peripheral face is in contact with the inner peripheral face of the magnet 6. The coil 7 has a thickness thereof set nearly equal to the thickness of the magnet 6. The magnet 6 and the coil 7 are disposed coaxially with each other along a common plane extending perpendicular to the rotation axis (not shown), and the coil 7 is disposed radially inside the magnet 6.

The stator yoke 8 is made of a soft magnetic material and formed into a generally circular disk shape, and is provided at its center with a main shaft 8a. The stator yoke 8 has an outer diameter thereof set nearly equal to the outer diameter of the magnet 6.

The rotor yoke 9 is made of a soft magnetic material, and is provided with magnetic pole parts 9a that are magnetized by the coil 7. The magnetic pole parts 9a are opposed to the magnetized surface of the magnet 6 with a predetermined gap therebetween, and are formed into magnetic pole teeth extending radially outward. The number of the magnetic pole parts 9a is made equal to a value varying from one to n/2 (n represents the number of the magnetic poles of the magnet 6). In this embodiment, the number of the magnetic pole parts is equal to 2. The rotor yoke 9 is formed at its center with a hole 9a into which the main shaft 8a of the stator yoke 8 is fitted.

The aperture blade 10 is made of a material having a light blocking effect, and is comprised of a light shielding part 10a, an aperture hole 10b, and a rotation center hole 10c. The light shielding part 10a constitutes an annular circular portion of one end of the aperture blade 10. The inner hollow of the light shielding part 10a corresponds to the aperture hole 10b. The rotation center hole 10c is formed in another end of the aperture blade 10.

The aperture blade 10 is fixed integrally with the rotor yoke 9, and can be rotated coaxially with the rotor yoke 9 around the rotation center hole 10c to which the main shaft 8a of the stator yoke 8 is inserted. The aperture blade 10 can assume a rotating position (aperture state) in which it is capable of restricting the open area amount of the opening 11a of the base plate 11, and can retreat to a different rotating position (open state) where it is not superimposed on the opening 11a of the base plate 11. The rotor yoke 9 is directly affixed to the aperture blade 10.

It should be noted that members capable of adjusting the amount of light passing through the opening formed in the base plate or the stator yoke, such as the aperture blade 10 of this embodiment and the shutter blades of the first and second embodiments as well as members capable of changing the property of light transmitted therethrough such as an ND filter, a polarizing filter, and a color filter are referred to as light amount control blades. Although the opening 11a of the base plate 11 is opened and closed by means of the aperture blade 10 in the present embodiment, any of the aforesaid filters may be used to open and close the opening.

In the present embodiment, the stator of the driving device is constituted by the magnet 6 and the coil 7 that are coaxially fixed on one disk surface of the stator yoke 8. Further, the rotor of the driving device is constituted by the rotor yoke 9 and the aperture blade 10, which are fixed so that the hole 9b of the rotor yoke 9 and the rotation center hole 10c of the aperture blade 10 are disposed coaxially with each other, and which are supported for rotation around the main shaft 8a of the stator yoke 8.

In such construction, the periphery of the hole 9b of the rotor yoke 9 is covered by means of part (in which the rotation center hole is formed) of the aperture blade 10 which is excellent in sliding ability, and the stator yoke 8 is bearing supported in the radial direction by means of the rotation center hole 10c. As a result, a predetermined gap is ensured between the rotor yoke 9 and the stator yoke 8, thereby preventing the increase in frictional force caused by a magnetic attractive force.

The base plate 11 is formed into a generally hollow circular disk shape, and is provided with an opening 11a formed in the central part of the base plate 11, a first rotation limiting pin 11b, and a second rotation limiting pin 11c. The first rotation limiting pin 11b is provided at a location near the opening 11a, and the aperture state is attained when the aperture blade 10 is in contact with the first rotation limiting pin 11b. The second rotation limiting pin 11c is provided at a location remote from the opening 11a and the open state is achieved when the aperture blade 10 is in contact with the second rotation limiting pin 11c as shown in FIG. 9.

The light amount adjusting device of the present embodiment is constituted by fixing the driving device comprised of the magnet 6, the coil 7, the stator yoke 8, and the rotor yoke 9 as well as the aperture blade 10, which are shown in FIGS. 7 and 8, to the base plate 11.

Next, an explanation will be given of how the rotor yoke 9 is rotated by switching the direction of power supply to the coil 7 that constitutes the driving device in the light amount adjusting device of this embodiment comprised of the driving device and the light amount control mechanism having the aforesaid construction.

The magnetic flux generated by power supply to the coil 7 flows along a magnetic path loop extending from the stator yoke 8 to the magnet 6 through the main shaft 8a of the stator yoke 8 and the magnetic pole parts 9a of the rotor yoke 9. When the direction of power supply to the coil 7 is changed, the direction of the magnetic flux flow can be changed, and the magnetic pole parts 9a of the rotor yoke 9 can each be magnetized to an N or S pole. As a result, the rotor yoke 9 receives a rotating torque due to the magnetic interaction between the rotor yoke 9 and the magnet 6.

As in the first embodiment, in the present embodiment, the state of the aperture blade 10 can be changed between the aperture state and the open state by rotating the rotor yoke 9 relative to the magnet 6 by changing the direction of power supply to the coil 7.

Ordinarily, the magnet has a thickness in a range of 0.4 mm to 1.0 mm, whereas the rotor yoke has a thickness in a range of 0.2 mm to 0.5 mm. The thickness of the magnet is twice as large as the thickness of the rotor yoke. With this embodiment where the rotor yoke 9 is directly affixed to the shutter blade (aperture blade) 10, the mass and the inertia moment of the rotor section can be made smaller as compared with the prior art where the magnet is rotated. This is advantageous for a high speed shutter operation and a reduction of power consumption. Further, the arrangement directly affixing the rotor yoke 9 to the shutter blade 10 makes it possible to carry out the operation with reduced friction as compared to the case using driving pins.

As explained above, with the present embodiment having the construction in which the rotor yoke 9 is directly affixed to the shutter blade (aperture blade) 10, a high speed shutter operation and a reduction in power consumption can be achieved, and operations with less friction can also be realized.

Although the light amount adjusting devices have been explained in the first through third embodiments, the present invention is also applicable to a camera and a video camera on which such a light amount adjusting device is mounted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-307504, filed Oct. 21, 2005 which is hereby incorporated by reference herein in its entirety.

What is claimed is:

1. A driving device comprising:
  a magnet formed into a hollow circular disk shape, at least one disk surface of said magnet being magnetized to have alternately different poles in a circumferential direction thereof;
  a rotor yoke disposed for rotation relative to said magnet, said rotor yoke having magnetic pole parts thereof extending radially of said magnet and facing the magnetized disk surface of said magnet;
  a stator yoke disposed on a side remote from said rotor yoke with respect to said magnet, with said magnet interposed between said stator yoke and said rotor yoke, said stator yoke being fixed with said magnet; and
  a coil, fixed to said stator yoke, for magnetizing the magnetic pole parts of said rotor yoke.

2. A driving device according to claim 1, wherein said coil and said magnet are disposed coaxially with each other, said coil being disposed radially outside said magnet.

3. A driving device according to claim 1, wherein said coil and said magnet are disposed coaxially with each other, said coil being disposed radially inside said magnet.

4. A driving device according to claim 1, comprising a bearing member made of a nonmagnetic material, and wherein said bearing member is interposed between said rotor yoke and said stator yoke so that these yokes are not in direct contact with each other and said rotor yoke is rotatably supported by said bearing member.

5. A driving device according to claim 4, comprising a bobbin around which said coil is wound, and wherein said bobbin also serves as said bearing member.

6. A light amount adjusting device, comprising:
  a driving device;
  a base plate formed with an opening; and
  a light amount control member,
  wherein said driving device comprises:
  a magnet formed into a hollow circular disk shape, at least one disk surface of said magnet being magnetized to have alternately different poles in a circumferential direction thereof;
  a rotor yoke disposed for rotation relative to said magnet, said rotor yoke having magnetic pole parts thereof extending radially of said magnet and facing the magnetized disk surface of said magnet;
  a stator yoke disposed on a side remote from said rotor yoke with respect to said magnet, with said magnet interposed between said stator yoke and said rotor yoke, said stator yoke being fixed with said magnet; and
  a coil, fixed to said stator yoke, for magnetizing the magnetic pole parts of said rotor yoke, and
  wherein said light amount control member is operable with rotation of said rotor yoke of said driving device to adjust an open area amount of said opening of said base plate.

7. A light amount adjusting device according to claim 6, wherein said light amount control member is disposed radially inside said magnet of said driving device.

8. A light amount adjusting device according to claim 6, wherein said light amount control member is fixed integrally with said rotor yoke and is rotatable coaxially with said rotor yoke.

9. A light amount adjusting device according to claim 6, wherein said stator yoke also serves as said base plate.

* * * * *